(12) United States Patent
Kurosawa

(10) Patent No.: US 7,885,783 B2
(45) Date of Patent: Feb. 8, 2011

(54) REMAINING GAS AMOUNT CALCULATING DEVICE

(75) Inventor: Atsushi Kurosawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 62 days.

(21) Appl. No.: 12/142,877

(22) Filed: Jun. 20, 2008

(65) Prior Publication Data

US 2008/0319687 A1 Dec. 25, 2008

(30) Foreign Application Priority Data

Jun. 21, 2007 (JP) .............................. 2007-163958

(51) Int. Cl.
*G01L 7/00* (2006.01)
(52) U.S. Cl. ................................... 702/138
(58) Field of Classification Search ................. 702/138, 702/45, 50, 55, 140; 700/281; 73/861
See application file for complete search history.

(56) References Cited

U.S. PATENT DOCUMENTS

| | | | | |
|---|---|---|---|---|
| 5,878,777 | A | * | 3/1999 | Skoglund ..................... 137/504 |
| 6,227,420 | B1 | * | 5/2001 | Jepson ....................... 222/571 |
| 6,497,139 | B1 | * | 12/2002 | Locatelli ....................... 73/38 |
| 7,313,487 | B2 | * | 12/2007 | Yoshioka et al. .............. 702/51 |
| 2006/0110640 | A1 | * | 5/2006 | Yoshida et al. ................ 429/25 |
| 2007/0051172 | A1 | * | 3/2007 | Perinet et al. ............. 73/290 R |
| 2007/0244363 | A1 | * | 10/2007 | Sano et al. ................... 600/158 |
| 2009/0252618 | A1 | * | 10/2009 | Gensert ....................... 417/187 |

FOREIGN PATENT DOCUMENTS

JP 2005-240854 A 9/2005

\* cited by examiner

*Primary Examiner*—Cindy H Khuu
(74) *Attorney, Agent, or Firm*—Keating & Bennett, LLP

(57) ABSTRACT

A remaining gas amount calculating device includes a hydrogen tank, an opening/closing valve arranged to deliver hydrogen gas from inside the hydrogen tank, a decompression valve arranged to decompress hydrogen gas delivered from the hydrogen tank, a pressure sensor arranged to measure the pressure of hydrogen gas decompressed with the decompression valve, and a power source system controller arranged to determine the remaining gas amount in the hydrogen tank by calculating the gas pressure in the hydrogen tank based on the hydrogen gas pressure measured with the pressure sensor. The relationship between pressures in a primary chamber and a secondary chamber of the decompression valve is monotonical such that when the pressure in the primary chamber increases, the pressure in the secondary chamber also increases; and when the pressure in the primary chamber decreases, the pressure in the secondary chamber also decreases. The remaining gas amount calculating device makes it possible to calculate the amount of gas remaining in a gas container without using a gas pressure measuring device that measures directly the pressure in the gas container.

13 Claims, 5 Drawing Sheets

REMAINING GAS AMOUNT CALCULATING DEVICE

BACKGROUND OF THE INVENTION

1. Field of the Invention

The present invention relates to a remaining gas amount calculating device for determining the amount of gas remaining in a gas container holding a specified gas.

2. Description of the Related Art

Conventionally, there are devices that gradually let out and use gas held in a gas container holding a specified gas. Such devices include, for example, vehicles that run utilizing electric power generated with a fuel cell system including fuel cells. Such a fuel cell system is provided with a hydrogen tank holding hydrogen gas. The fuel cell generates electric power by causing a reaction between hydrogen gas supplied from the hydrogen tank and oxygen in the air. Such a fuel cell system is also generally provided with a measuring device for measuring the remaining amount in the hydrogen tank (see JP-A 2005-240854, for example).

This fuel cell system includes a fuel cell, a compressor for supplying air to the fuel cell, a hydrogen tank connected through a decompression valve to the fuel cell to provide hydrogen gas to the fuel cell, a pressure sensor for measuring the pressure in the hydrogen tank, a temperature sensor for measuring the temperature in the hydrogen tank, and a controller. The fuel cell generates electric power by causing a reaction between hydrogen gas depressurized to a specified pressure with the decompression valve and oxygen gas in the air supplied from the compressor. The controller, according to the values detected by the pressure sensor and the temperature sensor, calculates the remaining amount of hydrogen gas in the hydrogen tank both as a display value for a pressure meter and as a display value for a mass meter. When the pressure measurement is equal to or more than a specified value, a display value for the mass meter is displayed on the fuel meter; and when the pressure measurement is less than the specified value, a display value for the pressure meter is displayed on the fuel meter.

However, as the above-described conventional fuel system uses a pressure sensor that directly measures the pressure in the hydrogen tank, it has been necessary to use a pressure sensor that has a sealing property against high pressure gas, and is accordingly expensive. Moreover, it has also been necessary to make the structure around the pressure sensor elaborate and sturdy.

SUMMARY OF THE INVENTION

In order to overcome the problems described above, preferred embodiments of the present provide a remaining gas amount calculating device that makes it possible to calculate the remaining gas amount in a gas container without using a gas pressure measuring device that directly measures pressure in the gas container.

According to a preferred embodiment of the present invention, the remaining gas amount calculating device includes a gas container holding a specified gas, a decompression device arranged to depressurize the gas delivered from the gas container, a gas pressure measuring device arranged to measure a pressure of the depressurized gas depressurized with the decompression device, and a remaining gas amount calculating device arranged to determine an amount of gas remaining in the gas container by calculating a pressure of the gas in the gas container based on the pressure measured with the gas pressure measuring device, wherein the decompression device is arranged so that the relationship between the pressure at an inlet side portion of the decompression device body through which the gas is provided and the pressure at an outlet side portion of the decompression device body through which the depressurized gas is delivered is a monotonical relationship such that when the inlet side portion pressure increases, the outlet side portion pressure also increases and when the inlet side portion pressure decreases, the outlet side portion pressure also decreases.

The remaining gas amount calculating device preferably does not directly measure the pressure of the compressed, high pressure gas in the gas container but measures the pressure of the gas decompressed with the decompression device after the gas is delivered from the gas container. Therefore, high pressure is not applied to the gas pressure measuring device so that it becomes unnecessary to use a gas pressure measuring device that has a sealing property against high pressure and is accordingly expensive, and it is possible to simplify the structure around the gas pressure measuring device. Moreover, the decompression device preferably has a monotonical relationship such that when the pressure at the inlet side portion of the decompression device body through which the gas is provided increases, the pressure at the outlet side portion of the decompression device body through which the depressurized gas is delivered also increases; and when the pressure at the inlet side portion decreases, the pressure at the outlet side portion also decreases. That is, the pressure of the gas depressurized by the decompression device varies according to the pressure in the gas container.

According to the above relationship, the pressure at the inlet side portion corresponding to the pressure at the outlet side portion of the decompression device has only one value. Therefore, when the relationship between the inlet side portion pressure and the outlet side portion pressure of the decompression device is predetermined and defined by data, it is easy to determine the pressure at the inlet side portion of the decompression device, or the pressure in the gas container from the pressure, measured with the gas pressure measuring device, at the outlet side portion of the decompression device. The monotonical relationship in this case means that when the outlet side portion pressure and the inlet side portion pressure are expressed as a curve on a graph, with one of the pressures plotted along the lateral axis and the other along the vertical axis, the curve rises or falls monotonically without once increasing followed by a decrease or without once decreasing followed by an increase. However, it need not necessarily be a perfect proportional relationship of a linear increase or decrease.

Another structural feature of the remaining gas amount calculating device according to a preferred embodiment of the present invention is a throttling surface having a diameter increasing toward the outlet side portion provided between the inlet side portion and the outlet side portion on the inside surface of the decompression device body, and a piston having a diameter increasing from the inlet side portion toward the outlet side portion provided in close communication between the inlet side portion and the outlet side portion as it contacts the throttling surface, and to define a gas passage, between the piston and the throttling surface as it retracts from the throttling surface, for providing communication between the inlet side portion and the outlet side portion.

It is assumed that P1 is the pressure at the inlet side portion of the decompression device that is equal to the pressure in the gas container, P2 is the pressure at the outlet side portion after decompression, S1 is the area of the piston surface opposite the inlet side portion, S2 is the area of the piston surface opposite the outlet side portion, F1 is the force that pushes the piston toward the outlet side of the decompression device, and F2 is the force that pushes the piston toward the inlet side of the decompression device. Then, F1 and F2 are expressed, respectively, by the following equations (1) and (2).

$$F1 = P1 \times S1 \quad (1)$$

$$F2 = P2 \times S2 \quad (2)$$

When F1 is greater than F2, the piston retracts from the throttling surface to define a gas passage between the piston and the throttling surface and moves toward the outlet so as to increase the cross-sectional area of the gas passage. When F1 becomes smaller than F2, the piston moves to the inlet side and closes the gas passage. When F1 becomes equal to F2 and the pressure at the inlet side portion is held approximately constant, the following equation (3) holds.

$$P2 = S1/S2 \times P1 \quad (3)$$

According to the relationship of equation (3), P2 increases with the increase in P1, and P2 decreases with the decrease in P1. In this way, with the above decompression device, a monotonical relationship holds in which, when the pressure at the inlet side portion through which gas is provided increases, the pressure at the outlet side portion through which depressurized gas is delivered out also increases; when the pressure at the inlet side portion decreases, the pressure at the outlet side portion also decreases.

Still another structural feature of the remaining gas amount calculating device includes a spring arranged to force the piston to retract from the throttling surface. In this way, it is possible to prevent a breakage of the piston by moving of the piston quickly when a supply of the gas started.

Still another structural feature of the remaining gas amount calculating device is that the gas is hydrogen gas, the gas container is a hydrogen tank, and the hydrogen gas delivered from the hydrogen tank is sent to a fuel cell that generates electric power by causing a reaction between the hydrogen gas and oxygen gas. In this way, it is possible to calculate the remaining amount of hydrogen gas in the hydrogen tank for supplying hydrogen gas to the fuel cell without using an expensive gas pressure measuring device.

Still another structural feature of the remaining gas amount calculating device is that a generated electric current detector is provided to detect an electric current generated with the fuel cell, and arranged to calculate, according to the generated electric current detected by the generated current detector, a hydrogen gas flow rate supplied from the hydrogen tank to the fuel cell, and the remaining gas amount calculating device, based on the hydrogen gas flow rate, determines the remaining gas amount in the hydrogen tank.

Pressures at the inlet side portion and the outlet side portion of the decompression device also vary with the flow rate of the hydrogen gas supplied from the hydrogen tank to the fuel cell. Therefore, it is possible to calculate with higher accuracy the remaining amount of hydrogen gas in the hydrogen tank by determining in advance the relationship between the inlet side pressure and the outlet side pressure corresponding to the hydrogen gas flow rate, based on the hydrogen gas flow rate. The hydrogen gas flow rate in this case may be determined from the relationship between an electric charge and the generated current occurring when hydrogen molecules react.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
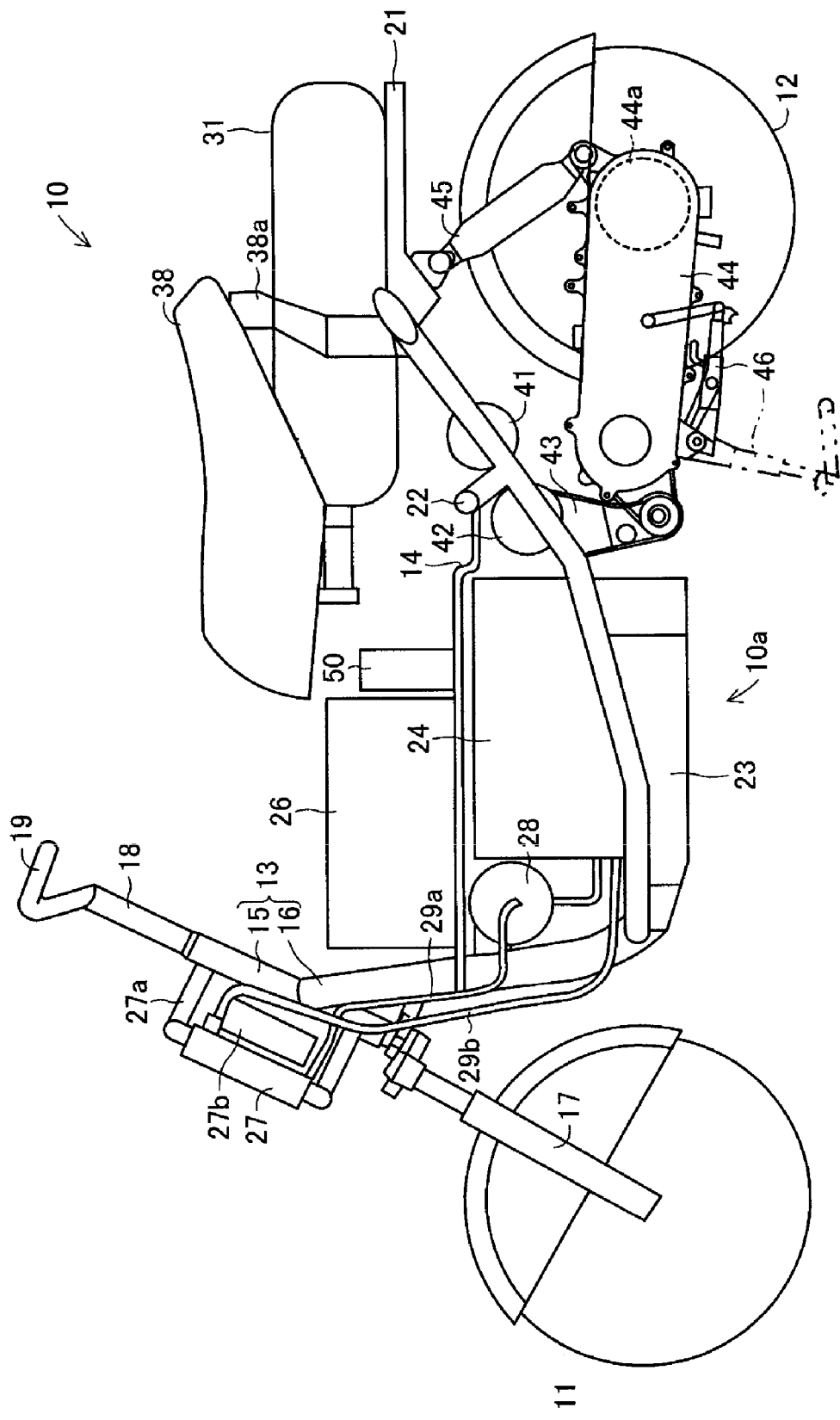
FIG. 1 is a side view of a motorcycle provided with a remaining gas amount calculating device according to a preferred embodiment of the present invention.

A remaining gas amount calculating device according to preferred embodiments of the present invention will be hereinafter described in detail with reference to the appended drawings. FIG. 1 shows a motorcycle 10 provided with a remaining gas amount calculating device A (See FIG. 2) according to a preferred embodiment. The motorcycle 10 includes a pair of wheels including a front wheel 11 and a rear wheel 12, and a chassis 10a to which the paired wheels are attached. The chassis 10a includes a chassis frame 13 as the main portion of the chassis 10a, and a sub-frame 14 that may be freely attached to or removed from the chassis frame 13. The chassis frame 13 includes a head pipe 15 defining the front portion of the chassis 10a, and a main frame 16 extending from the head pipe 15 toward the rear.

The front wheel 11 is attached for free rotation to the lower end of a front fork 17 with its lower end bifurcated. The lower end of a steering shaft 18 disposed in the head pipe 15 is attached to the upper end of the front fork 17. The steering shaft 18, in the state of being rotatable about the axis of the head pipe 15, is fit in the head pipe 15, and its upper end projects and extends upward from the head pipe 15. The central portion of a handlebar 19 disposed approximately horizontally is connected to the upper end of the steering shaft 18.

Therefore, when the steering shaft 18 is turned about its axis as the handlebar 19 is turned, the front wheel 11 changes its direction to the right and left about the axis of the front fork 17 according to a rotational amount of the steering shaft 18. The right and left ends of the handlebar 19 are provided with grips (not shown). One of the grips is arranged to be rotatable about its axis and to be gripped by a hand, and define an accelerator operating member for regulating the driving power of a driving motor 44a (described below). The other grip is fixed to the handlebar 19 to also be gripped by a hand. A brake lever (not shown) is provided near each of the grips. The brake lever is forced to move away from the grip, and when it is squeezed toward the grip, it restricts the rotation of the front wheel 11 or the rear wheel 12.

The main frame 16 includes a pair of curved frames (only one is shown) with their front ends (upper ends) connected to both side portions of the lower end portion of the head pipe 15. Both of the main frames 16 extend from the portion connected to the head pipe 15 obliquely and rearwardly downward while widening their distance from each other, and curve to extend horizontally rearward. The rear portions of both of the main frames 16 further extend obliquely and rearwardly upward while maintaining their distance from each other. The rear ends of both of the main frames 16 are connected to a plate-shaped attachment member 21 disposed horizontally.

A cross member 22 interconnects the top surfaces of the rear portions of both of the main frames 16. The cross member 22 is made of a bar with both end portions bent at about right angles to form a quasi U-shape with the bent end portions connected to the main frame 16, and with the main portion projecting above the main frame 16. A mounting table 23 projecting downward between both of the main frames 16 interconnects the lower ends of the main frames 16. The top surface of the mounting table 23 is provided with an indentation to provide a holding portion 24. A fuel cell 25 (See FIG. 2) is held in the holding portion 24.

The plate-shaped sub-frame 14 is attached between the front side portion of the main frames 16 and the cross member 22 provided in the rear portion of the main frames 16. A secondary battery 26 having a lithium ion cell is secured to a portion of the top surface slightly forward from the middle of the sub-frame 14. A power source system controller 50 arranged to control various devices provided in the remaining gas amount calculating device A is secured to a portion of the top surface in the rear portion of the sub-frame 14.

A radiator 27 is attached through a securing member 27a to the front portion of the head pipe 15. A fan 27b for air-cooling the radiator 27 is attached to the back surface (between the radiator 27 and the head pipe 15) of the radiator 27. A water pump 28 is attached to a portion of the main frame 16 on the front side of the holding portion 24 in the front portion under the sub-frame 14 (secondary battery 26). The radiator 27 and the fuel cell 25 are interconnected through a cooling water pipe 29a. The water pump 28 is provided in the cooling water pipe 29a.

The cooling water pipe 29a extends from the radiator 27 to the water pump 28, from the water pump 28 toward the holding portion 24, from the front surface portion of the holding portion 24 to the inside, and connected to the fuel cell 25. The fuel cell 25 and the radiator 27 are interconnected through a cooling water pipe 29b through which cooling water, after cooling the fuel cell 25, flows from the fuel cell 25 toward the radiator 27. Therefore, when the water pump 28 is operated, cooling water in the radiator 27 is sent through the cooling water pipe 29a to the fuel cell 25 to cool the fuel cell 25. The cooling water, which absorbs heat as it cools the fuel cell 25, is sent back through the cooling water pipe 29b to the radiator 27 and cooled, while flowing through the radiator 27, with the fan 27b.

Figure 2:
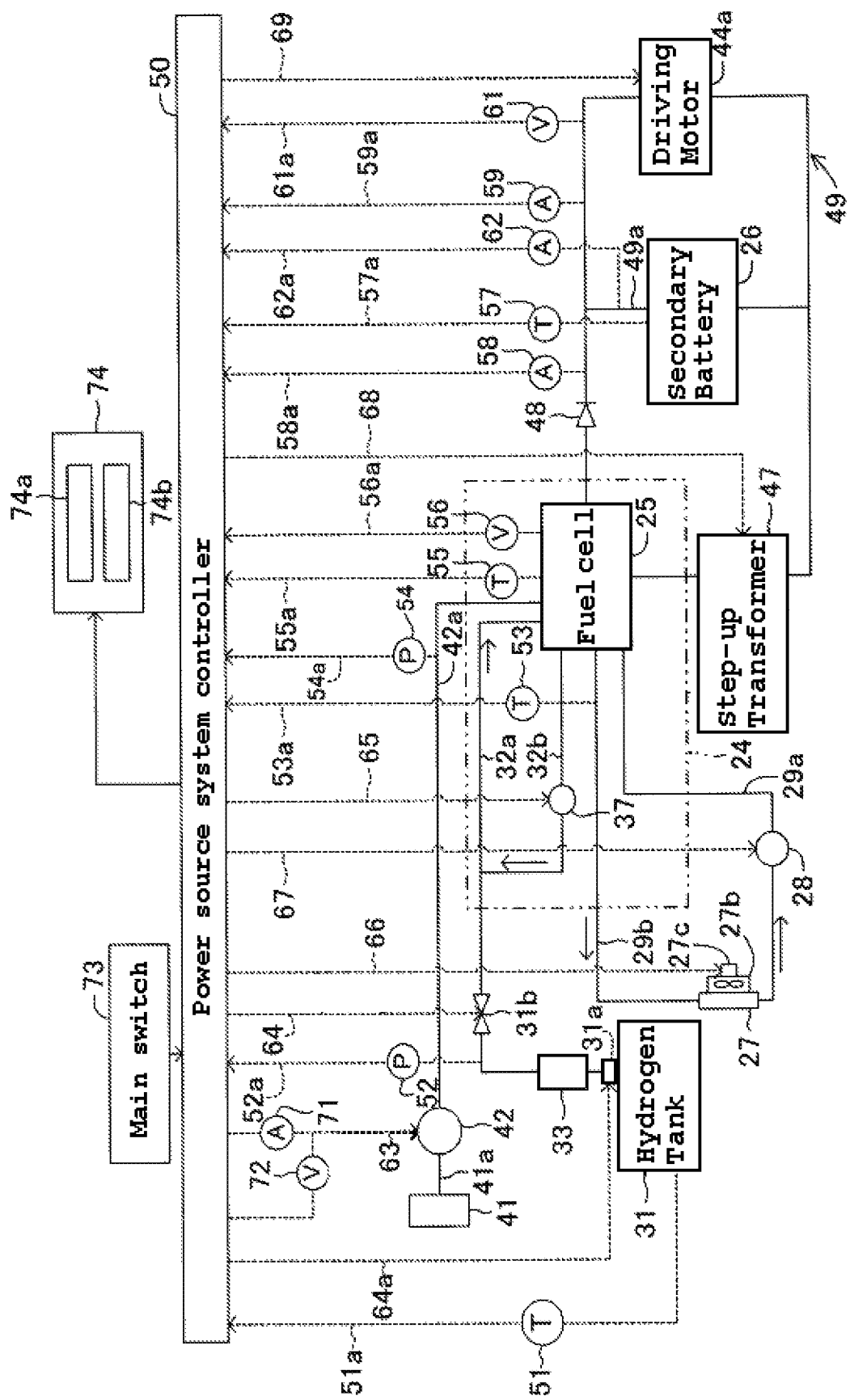
FIG. 2 shows a schematic arrangement of the remaining gas amount calculating device.

A hydrogen tank 31 filled with hydrogen to be supplied to the fuel cell 25 is attached to the top surface of the attachment member 21 connected to the rear end portion of the main frames 16. The hydrogen tank 31, as shown in FIG. 2, is connected through a gas pipe 32a to the hydrogen gas supply port of the fuel cell 25. The hydrogen gas discharge port of the fuel cell 25 is connected through a gas pipe 32b for circulating hydrogen to a portion of the gas pipe 32a between the hydrogen tank 31 and the fuel cell 25. An opening/closing valve 31a, a decompression valve 33, and a regulation valve 31b arranged to regulate pressure are provided in a portion of the gas pipe 32a on the hydrogen tank 31 side.

Figure 3:
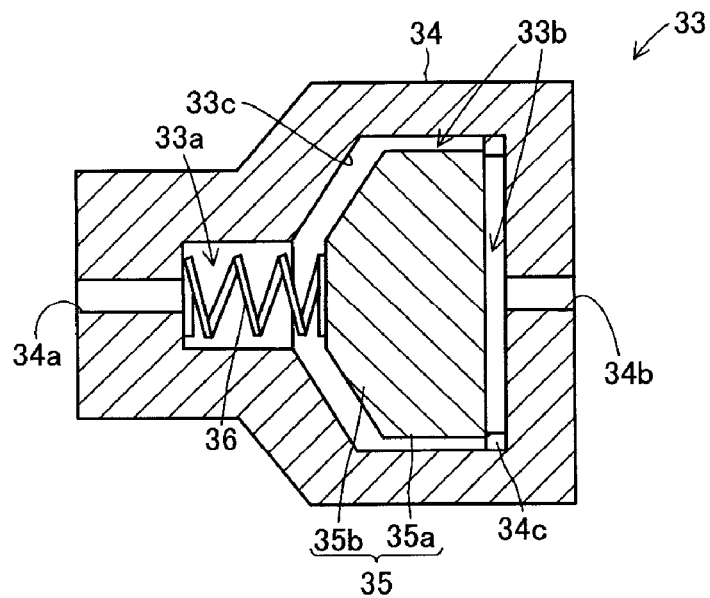
FIG. 3 is a cross-sectional view of the decompression valve.

The decompression valve 33 as shown in FIG. 3 preferably includes a valve body 34 bored through from the inlet 34a to the outlet 34b, a piston 35 placed in the valve body 34, and a spring 36. The valve body 34 preferably has approximately cylindrical shape with different diameters wherein the inlet 34a side (hydrogen tank 31 side) is thinner than the outlet 34b side (fuel cell 25 side) and the portion between the inlet 34a side and the outlet 34b side is flared. The inlet 34a and the outlet 34b have a small diameter. A portion of the inside of the valve body 34 on the inlet 34a side includes a primary chamber 33a greater in diameter than the inlet 34a and the outlet 34b. A portion of the inside of the valve body 34 on the outlet 34b side includes a secondary chamber 33b having a diameter even greater than the diameter of the primary chamber 33a.

A flared throttling surface 33c, flaring from the primary chamber 33a toward the secondary chamber 33b, is arranged in a portion of the inside of the valve body 34 between the primary chamber 33a and the secondary chamber 33b. A plural number of stoppers 34c are provided at circumferential intervals in the peripheral portion of the end surface of the interior of the secondary chamber 33b on the outlet 34b side. The piston 35 includes a piston body 35a shaped as a cylinder of a short axial length with a throttling projection 35b having a truncated cone shape projecting from one side (the primary chamber 33a side). The piston 35 is installed to be movable toward the inlet 34a or the outlet 34b within the secondary chamber 33b and the throttling surface 33c. As the piston 35 moves, a gas passage between the inside surface of the secondary chamber 33b and the throttling surface 33c is opened or closed.

That is, when the piston 35 moves toward the inlet 34a, the throttling projection 35b comes into surface contact with the throttling surface 33c to close communication between the primary chamber 33a and the secondary chamber 33b within the valve body 34. The outside diameter of the piston body 35a is made slightly smaller than the inside diameter of the secondary chamber 33b, with a gas passage defined between the outside round surface of the piston body 35a and the inside round surface of the secondary chamber 33b. When the piston 35 moves toward the outlet 34b, the throttling projection 35b separates from the throttling surface 33c to define the gas passage between the throttling projection 35b and the throttling surface 33c.

In this way, the inlet 34a and the outlet 34b are interconnected through the primary chamber 33a, the gas passage between the throttling projection 35b and the throttling surface 33c, the gas passage between the outside round surface of the piston body 35a and the inside round surface of the secondary chamber 33b, and the secondary chamber 33b. Incidentally, the gas passage between the throttling projection 35b and the throttling surface 33c, and the gas passage between the outside round surface of the piston body 35a and the inside round surface of the secondary chamber 33b, are actually very narrow. However, they are depicted as being wide in FIG. 3 for the convenience of illustration.

When the piston 35 moves further toward the outlet 34b and the peripheral portion of the end surface of the piston body 35a on the outlet 34b side contacts the stoppers 34c, the piston 35 cannot move further toward the outlet 34b. Here, as shown in FIG. 3, the stoppers 34c prevent the inside opening of the outlet 34b from being closed by the piston 35. Accordingly, the decompression valve 33 is held in the state of maintaining the gas passage interconnecting the inlet 34a and outlet 34b. The spring 36 is installed in the primary chamber 33a of the valve body 34 to force the piston 35 toward the outlet 34b. This spring 36 is preferably a coil spring with one end positioned on the boundary step between the inlet 34a and the primary chamber 33a and the other end in contact with the end surface of the throttling projection 35b.

A circulation pump 37 is provided on the gas pipe 32b to send unreacted hydrogen gas discharged from the hydrogen gas discharge port of the fuel cell 25 back to the gas pipe 32a. Therefore, it is possible, by opening the opening/closing valve 31a, to decompress the hydrogen gas in the hydrogen tank 31 with the decompression valve 33 and supply it through the gas pipe 32a to the fuel cell 25. It is also possible, in that state, to operate the circulation pump 37 and send unreacted hydrogen gas remaining in the fuel cell 25 through the gas pipe 32b back to the gas pipe 32a, so that it flows together with hydrogen gas additionally provided from the hydrogen tank 31 through the decompression valve 33 to the gas pipe 32a.

Hydrogen gas circulates in the gas pipes 32a and 32b until it reacts with oxygen gas in the fuel cell 25. A seat 38 is attached to the upper front portion of the hydrogen tank 31. The seat 38 is connected through a supporting member 38a to the rear portion of the main frames 16. An air filter 41 is attached to the rear portion of the main frames 16 behind the cross member 22. An air blower 42 is attached to the rear portion of the main frames 16 in front of the cross member 22.

As shown in FIG. 2, the air filter 41 and the air blower 42 are interconnected through the gas pipe 41a, and the air blower 42 and the fuel cell 25 are interconnected through the gas pipe 42a. Therefore, air is drawn from under the seat 38 through the air filter 41 and supplied to the fuel cell 25 by the operation of the air blower 42. When air is suctioned to and flows through the air filter 41, foreign matter is removed. When air flows through the fuel cell 25, it reacts with hydrogen gas. The air, except the oxygen gas used for electric power generation by the fuel cell 25 as the air flows through the fuel cell 25 while reacting with the hydrogen gas, is discharged to the outside. The gas pipe 32a, a portion of the gas pipe 42a, and the gas pipe 32b are housed together with the fuel cell 25 in the holding portion 24.

Rear arms (not shown) made of a pair of arm members extending toward the rear are connected through a connecting member 43 to the rear lower portion of the main frames 16. Both ends of the center shaft of the rear wheel 12 are supported for rotation at the rear end portions of the arm members of the rear arms. Thus, the rear wheel 12 is permitted to rotate about the center shaft. A motor unit 44 is attached to the outer side of one arm member of the rear arms so as to cover the arm member.

The motor unit 44 includes the driving motor 44a operating on electric power generated with the fuel cell 25, a transmission, etc. As the driving motor 44a is operated, the rear wheel 12 rotates to drive the motorcycle 10. Rear shock absorbers 45 interconnect the rear ends of the main frames 16 and the rear upper portions of the rear arms. The rear ends of the rear arms are adapted to swing freely as the rear shock absorbers 45 extend and contract. A drum brake (not shown) is provided on the inner side of the motor unit 44.

The driving motor 44a is operated and controlled by the power source system controller 50 according to the operation of the grip on the handlebar 19 to automatically produce a driving force on the rear wheel 12. The motorcycle 10 is also provided with a pivot type of stand 46 for keeping the motorcycle 10 in an upright attitude when it is in a standing state. When the motorcycle 10 is to be driven, the stand 46 is swung up as shown with solid lines in FIG. 1. When the motorcycle 10 is made to stand, the stand 46 is swung down as shown with phantom lines in FIG. 1 to let the stand 46 support the motorcycle 10.

The remaining gas amount calculating device A is further provided with a step-up transformer 47 arranged to boost the electric power generated by the fuel cell and a diode 48 for preventing a reverse current. The fuel cell 25, the secondary battery 26, the driving motor 44a, the step-up transformer 47, the diode 48, and the wires interconnecting these components define an electric circuit 49. Various devices defining the remaining gas amount calculating device A are provided with various sensors for detecting various conditions of the devices. These sensors and the power system controller 50 are interconnected through respective electrical wires.

That is, the hydrogen tank 31 is provided with a temperature sensor 51 for detecting the surface temperature of the hydrogen tank 31. A portion of the gas pipe 32a between the decompression valve 33 and the regulation valve 31b is provided with a pressure sensor 52 as a gas pressure measuring device for detecting the pressure of hydrogen gas delivered from the hydrogen tank 31 and decompressed with the decompression valve 33. On the basis of the hydrogen gas pressure detected with the pressure sensor 52, the remaining gas amount in the hydrogen tank 31 is calculated as will be described below. The cooling water pipe 29b is provided with a temperature sensor 53 for detecting the temperature of cooling water sent from the radiator 27 to the fuel cell 25 and sent from the fuel cell 25 to the radiator 27 after cooling the fuel cell 25. The gas pipe 42a is provided with a pressure sensor 54 for detecting the pressure of air supplied from the air blower 42 to the fuel cell 25.

The fuel cell 25 is provided with a temperature sensor 55 for detecting the temperature of the fuel cell 25 and with a voltage sensor 56 for detecting the voltage value. The secondary battery 26 is provided with a temperature sensor 57 for detecting the temperature of the secondary battery 26. The electric circuit 49 is provided with a current sensor 58 as a generated current detector for detecting the value of current flowing through the electric circuit 49, a current sensor 59 for detecting the value of current flowing through the driving motor 44a, and a voltage sensor 61 for detecting the voltage value. A wire 49a connected to the secondary battery 26 in the electric circuit 49 is provided with a current sensor 62 for detecting the value of current flowing through the secondary battery 26. These sensors are respectively connected through wires 51a, 52a, 53a, 54a, 55a, 56a, 57a, 58a, 59a, 61a, and 62a to the power source system controller 50 to send detected values as electric signals to the power source system controller 50.

To send instruction signals from the power source system controller 50 to the air blower 42, the opening/closing valve 31a, the regulating valve 31b, the circulation pump 37, the motor 27c for driving the fan 27b, the water pump 28, the step-up transformer 47, and the driving motor 44a, wires 63, 64a, 64, 65, 66, 67, 68, and 69 respectively interconnect the power source system controller 50 and the corresponding devices. The air blower 42 operates corresponding to the flow rate instruction signal from the power source system controller 50 to supply air to the fuel cell 25. The wire 63 is provided with a current sensor 71 and a voltage sensor 72. These sensors detect the current value and the voltage supplied to the air blower 42.

In response to the opening/closing signal from the power source system controller 50, the opening/closing valve 31a is opened or closed. At the same time, the regulating valve 31b is opened or closed with its opening degree regulated in response to the flow rate instruction signal to supply hydrogen gas from the hydrogen tank 31 to the fuel cell 25. The fuel cell 25 causes a reaction between oxygen gas in the air supplied from the air blower 42 and hydrogen gas supplied from the hydrogen tank 31 to produce water as well as electricity. At this time, the circulation pump 37 works in response to the operation instruction signal from the power source system controller 50 to send hydrogen gas that has not reacted with oxygen gas in the fuel cell 25 through the gas pipe 32b back to the gas pipe 32a and to cause it to flow together with hydrogen gas additionally sent from the hydrogen tank 31 to the gas pipe 32a.

The water pump 28 works in response to the operation instruction signal from the power source system controller 50 to cause cooling water to circulate between the radiator 27 and the fuel cell 25 and to maintain the temperature of the fuel cell 25 at a specified value. The motor 27c works in response to the operation instruction signal from the power source system controller 50 to rotate the fan 27b so as to air-cool the radiator 27. The step-up transformer 47, in response to the voltage instruction signal from the power source system controller 50, boosts the electricity generated by the fuel cell 25 and supplies it to and charges the driving motor 44a and to the secondary battery 26. The driving motor 44a receives an operation signal corresponding to the operation amount of the grip, or accelerator operating member, from the power source system controller 50 and works according to the operation signal.

The power source system controller 50 preferably includes a CPU, a RAM, a ROM, a non-volatile memory, etc. The ROM stores various data such as pre-arranged programs and maps shown in FIG. 4. The RAM and non-volatile memory store data such as values detected with various sensors to be rewritable. The CPU controls the driving motor 44a, the opening/closing valve 31a, the regulating valve 31b, the air blower 42, and the water pump 28 according to the grip operation by the driver and the pre-arranged programs. The motorcycle 10 is further provided with switches such as a main switch 73, and an indicator 74 having an internal pressure indicating section 74a for indicating the internal pressure of the hydrogen tank 31 and a remaining amount indicating section 74b for indicating the remaining amount of hydrogen gas. The power source system controller 50 configures the remaining gas amount calculating device as defined herein to calculate the internal pressure of the hydrogen tank 31 and the remaining amount of hydrogen gas to be indicated on the indicator 74.

In order to operate the motorcycle 10 having the above-described configuration, first, switches such as the main switch 73 are turned on. As a result, air from which foreign matter is removed with the air filter 41 is supplied from the air blower 42 to the fuel cell 25. At the same time, hydrogen gas decompressed with the decompression valve 33 is supplied from the hydrogen tank 31 to the fuel cell 25. The fuel cell 25 generates electricity by causing a chemical reaction between oxygen gas in the supplied air and hydrogen gas. Under that condition, the grip is operated according to the speed up to which the motorcycle 10 is to be accelerated. In this way, the power source system controller 50 causes the driving motor 44a to produce a driving force on the rear wheel 12.

In order to reduce the running speed of the motorcycle 10, the grip may be operated in the decelerating direction or the brake lever is squeezed as required. Thus, the motorcycle 10 is decelerated according to the squeezing amount of the brake lever, etc. While the fuel cell 25 is in operation, it is cooled with cooling water sent from the water pump 28 and maintained at a specified temperature. The internal pressure of the hydrogen tank 31 is indicated on the internal pressure indicating section 74a of the indicator 74, and the remaining amount of hydrogen gas in the hydrogen tank 31 is indicated on the remaining amount indicating section 74b of the indicator 74. The indication on the internal pressure indicating section 74a and the remaining amount indicating section 74b is provided by, for example, numerical values and lighting up specified lamps out of a plural number of lamps.

Figure 4:
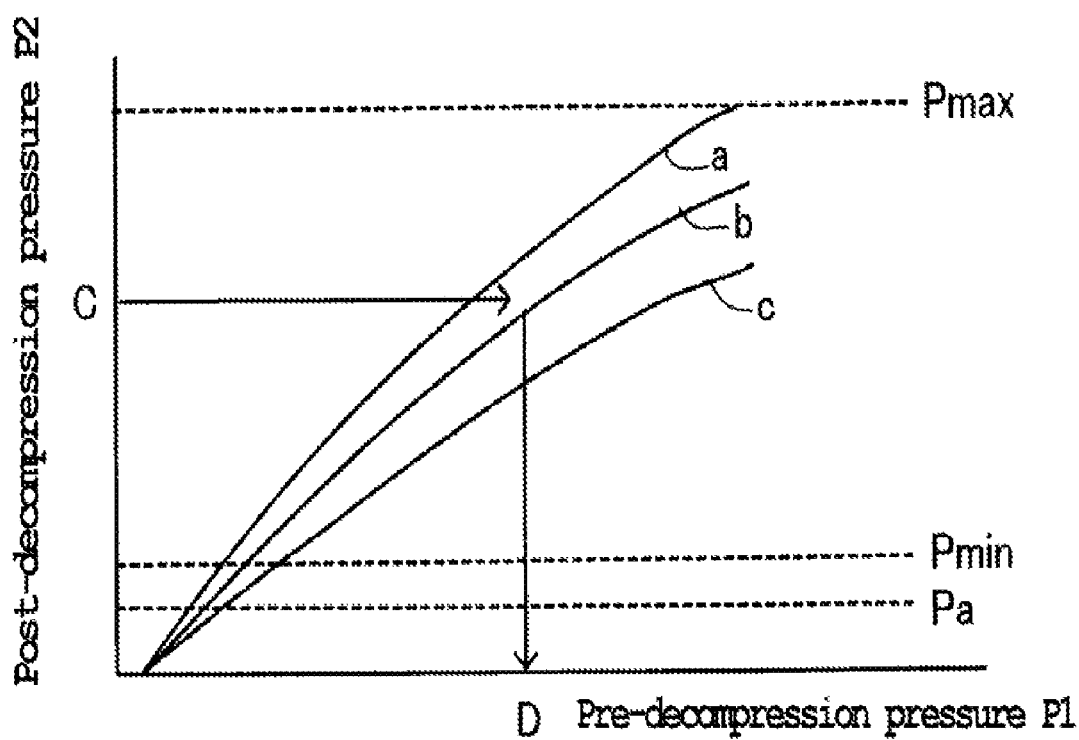
FIG. 4 is a graph, showing the relationship of the pressure in the hydrogen tank to the pressure of hydrogen gas after decompression.
Figure 5:
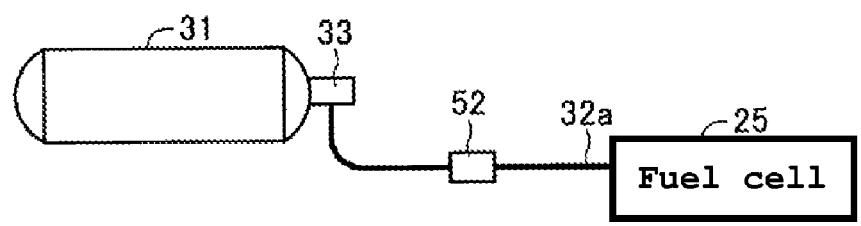
FIG. 5 schematically shows the positional relationship of the hydrogen tank, the decompression valve, the pressure sensor, and the fuel cell.

The indication on the indicator 74 is also carried out using calculating equations described below or maps shown in FIG. 4 to determine the pressure of the pressurized hydrogen in the hydrogen tank 31 corresponding to the pressure of the hydrogen gas decompressed with the decompression valve 33 and detected with the pressure sensor 52. In FIG. 4, the vertical axis plots the pressure after decompression detected with the pressure sensor 52, and the lateral axis plots the pressure before decompression. The positional relationship of the hydrogen tank 31, the decompression valve 33, the pressure sensor 52, and the fuel cell 25 is roughly shown in FIG. 5. The pressure sensor 52 is disposed between the fuel cell 25 and the decompression valve 33 provided downstream of the hydrogen tank 31 to detect the pressure of hydrogen gas after decompression.

In FIG. 4, the curve (a) shows the relationship, when the flow rate of hydrogen gas is a specified small value, between post-decompression pressure and pre-decompression pressure; the curve (b), the same relationship when the flow rate of hydrogen gas is approximately a specified medium value of hydrogen gas; and the curve (c), the same relationship when the flow rate of hydrogen gas is a specified high value. When the opening/closing valve 31a is open, the pre-decompression pressure in FIG. 4 is the same as the pressure in the hydrogen tank 31. Therefore, as shown in FIG. 4, when the hydrogen gas flow rate is medium, if the post-decompression pressure is C, it is possible to determine the pre-decompression pressure, or the pressure in the hydrogen tank 31, to be D. Then, the remaining hydrogen gas amount may be determined from the pressure in the hydrogen tank 31.

The broken line $P_{max}$ in FIG. 4 shows a post-decompression maximum pressure value when the fuel cell 25 is in operation; and the broken line $P_{min}$, a post-decompression minimum pressure value when the fuel cell 25 is in operation. The decompression valve 33 provided on the gas pipe 32a works to lower the post-decompression pressure below the maximum pressure value $P_{max}$. The opening/closing valve 31a is arranged to close when the remaining amount of hydrogen gas in the hydrogen tank 31 decreases and the post-decompression pressure decreases down to the minimum pressure $P_{min}$. On the other hand, hydrogen gas having passed through the decompression valve 33 is regulated with the regulating valve 31b so that the pressure $P_a$ after decompression with the decompression valve 33 is smaller than the $P_{min}$. Hydrogen gas of this pressure $P_a$ is supplied to the fuel cell 25.

The map of FIG. 4 has been prepared on the basis of characteristics of the decompression valve 33 and values detected with the current sensor 58, etc. First, the characteristic or functional principle of the decompression valve 33 will be described. When the opening/closing valve 31a is closed, the piston 35 of the decompression valve 33 is forced by the spring 36 toward the outlet 34b to be in contact with the stoppers 34c as shown in FIG. 3. In this case, the primary chamber 33a and the secondary chamber 33b are in fluid communication with each other through the gas passage between the throttling projection 35b and the throttling surface 33c. Therefore, the pressure in the primary chamber 33a is the same as the pressure in the secondary chamber 33b.

When the opening/closing valve 31a is opened, hydrogen gas in the hydrogen tank 31 flows through the inlet 34a of the decompression valve 33 into the primary chamber 33a. As a result, a force F1 expressed with the equation (1) below works on the piston 35 in the direction from the primary chamber 33a toward the outlet 34b. In equation (1), S1 is the area of the end surface of the throttling projection 35b, and B is the load of the spring 36.

$$F1 = P1 \times S1 + B$$

In this state, as the primary chamber 33a and the secondary chamber 33b are in communication with each other, the hydrogen gas sent to the primary chamber 33a flows also into the secondary chamber 33b. As a result, the force F2 expressed with the equation (2) below works on the piston 35 in the direction from the secondary chamber 33b toward the inlet 34a (See FIG. 6). Here, S2 in equation (2) is the area of the end surface of the piston body 35a.

$$F2 = P2 \times S2$$

Figure 7:
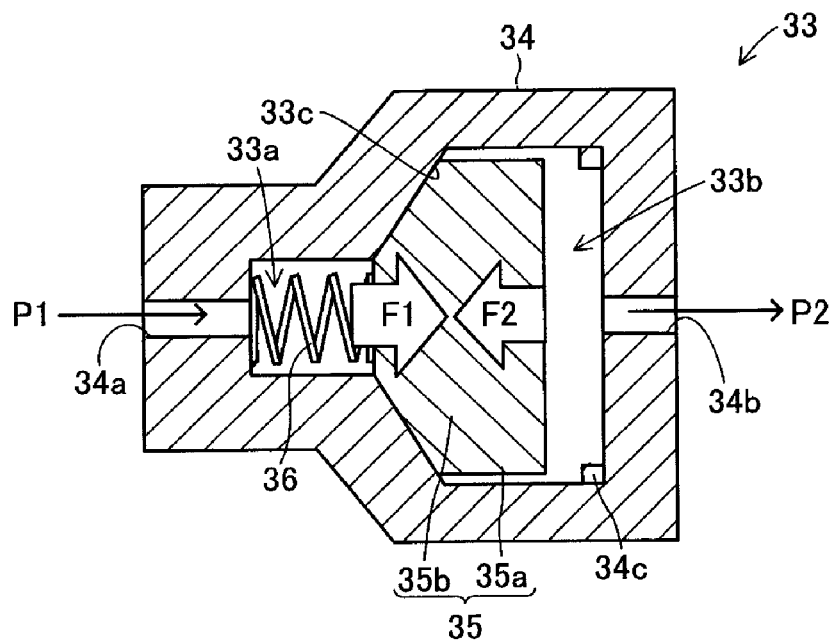
FIG. 7 is a cross-sectional view of the decompression valve with the gas flow passage closed.

When the supply of hydrogen gas passes to the secondary chamber 33b, the pressure in the secondary chamber 33b increases gradually. When the force F2 exceeds the force F1, the piston 35 begins to move toward the inlet 34a. Along with this motion, the gap between the throttling surface 33c and the throttling projection 35b narrows, so that the flow rate of hydrogen gas from the primary chamber 33a to the secondary chamber 33b tends to be restricted. When the throttling surface 33c and the throttling projection 35b come into surface contact with each other and the communication between the primary chamber 33a and the secondary chamber 33b is closed as shown in FIG. 7, the pressure in the secondary chamber 33b does not increase any more. This state is maintained until hydrogen gas in the secondary chamber 33b is consumed and the force F1 becomes the same value as that of the force F2.

Figure 6:
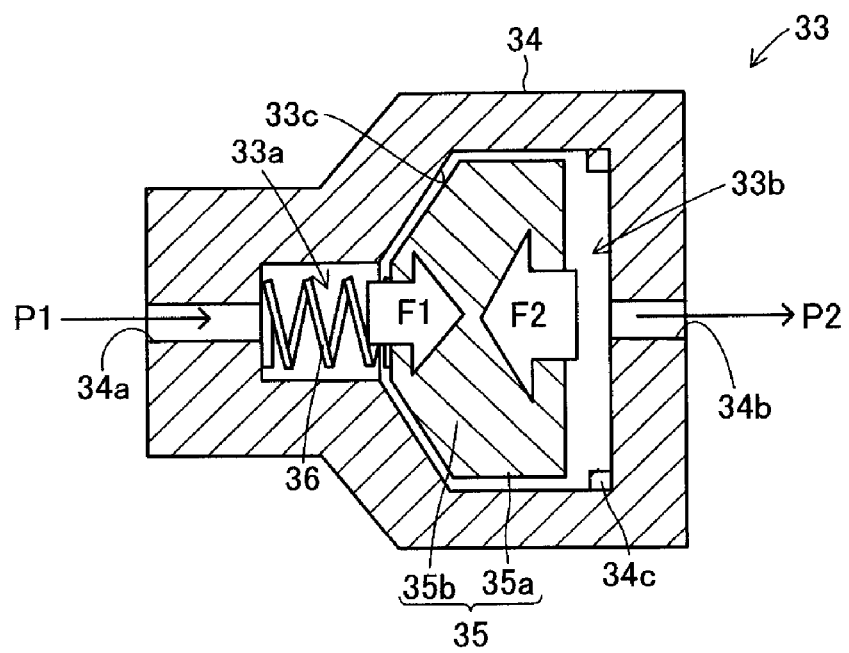
FIG. 6 is a cross-sectional view of the decompression valve with the piston about move toward the inlet.
Figure 8:
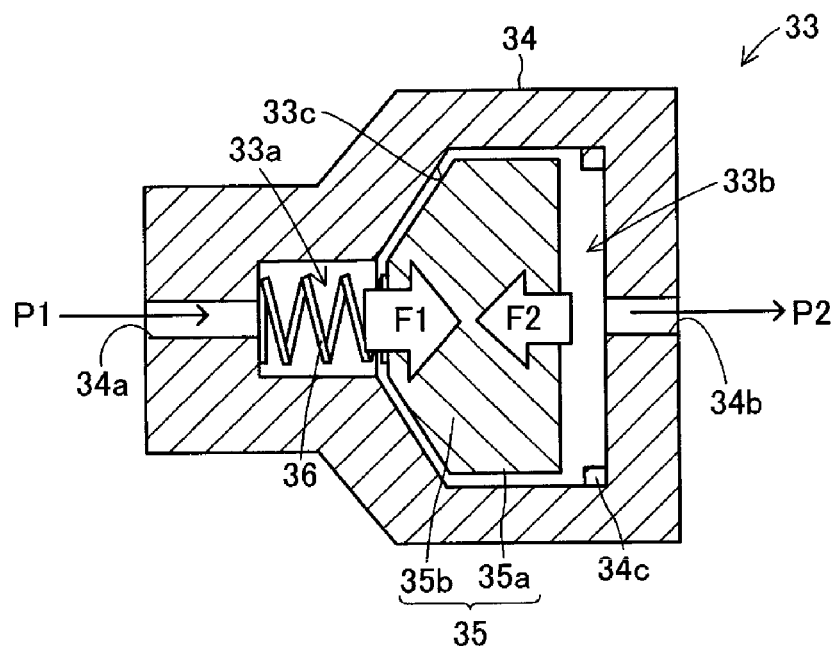
FIG. 8 is a cross-sectional view of the decompression valve with the piston about to move toward the outlet.

As shown in FIG. 8, as hydrogen gas in the secondary chamber 33b is consumed and the force F1 exceeds the force F2, the piston 35 begins to move toward the outlet 34b. Along with this motion, the gap between the throttling surface 33c and the throttling projection 35b widens gradually, hydrogen gas flows from the primary chamber 33a into the secondary chamber 33b, and the pressure in the secondary chamber 33b rises again. As the series of actions shown in FIGS. 6 to 8 are repeated, the pressure in the secondary chamber 33b is maintained approximately constant. In this case, as the state in which the force F1 is the same as the force F2 is maintained, the pressure in the secondary chamber 33b is expressed with the equation (3) below:

$$P2 = S1/S2 \times P1 + B/S2$$

In this case, the area S1 of the throttling projection 35b and the area S2 of the end surface of the piston body 35a are constant, and the load B of the spring 36 can be deemed to be approximately constant because its deflection is small. Therefore, an approximately proportional relationship holds between the pre-decompression pressure P1 and the post-decompression pressure P2 as shown in FIG. 4 with curves (a, b, and c). Pressures in the primary chamber 33a and the secondary chamber 33b of the decompression valve 33 vary also with the flow rate of hydrogen gas supplied from the hydrogen tank 31 to the fuel cell 25. Specifically, the pressures decrease if the flow rate increases. The reason for this is the increase of the flow resistance. The flow rate of hydrogen gas in this case may be determined from the relationship between the electric charge produced when hydrogen molecules react and the generated electric current.

In other words, according to Faraday's law of electrolysis, a reaction of 1 mole of hydrogen molecules produces an electric charge of 96,485 coulombs multiplied by 2 moles. One ampere is the current when one coulomb of electric charge moves through a conductor in one second. Therefore, the number of moles of hydrogen gas consumed per one second may be determined from the value of the electric current, generated with the fuel cell 25 and detected with the current sensor 58, divided by the value of electric charge of 96,485 coulombs multiplied by 2. It is possible to determine the flow rate of hydrogen gas from the molarity of hydrogen gas consumed per one second determined as described above. An alternative method may be used in which the relationship between the generated current value and the hydrogen gas flow rate is prepared in a map, and the hydrogen gas flow rate may be obtained in a simplified manner from the generated current by referring to the map.

The hydrogen gas flow rate per one second and the post-decompression pressure P2 determined as described above are plotted on the map of FIG. 4 to determine the pre-decompression pressure P1. The determined value of pressure P1 is indicated as the internal pressure of the hydrogen tank 31 on the internal pressure indicating section 74a of the indicator 74 while switches such as the main switch 73, etc. remain on. Assuming V to be the capacity of the hydrogen tank 31, R to be a gas constant, T to be the temperature of hydrogen tank 31 (hydrogen gas) detected with the temperature sensor 51, and (a) to be the mass or volume per one mole of hydrogen gas, the remaining hydrogen gas amount in the hydrogen tank 1 is expressed with the equation (4) below. As the temperature T, the value detected with the temperature sensor 51 may be used.

$$\text{Remaining hydrogen gas amount} = \{(P1 \times V)/(R \times T)\} \times a$$

In this case, the remaining hydrogen gas amount is determined in mass by assuming (a) is 2, or the remaining hydrogen gas amount is determined in volume under standard conditions (0° C.; 1 atm.) by assuming (a) to be 22.4. The value determined in this way is displayed on the remaining amount indicating section 74b. Incidentally, when ending the drive of the motorcycle 10, the main switch 73 is turned off and the motorcycle 10 is made to stand upright by swinging down the stand 46 so that it contacts the ground.

As described above, the remaining gas amount calculating device A according to the various preferred embodiments is arranged such that the pressure sensor 52 does not measure the high pressure in the hydrogen tank 31 but measures the pressure of hydrogen gas after it is delivered from the hydrogen tank 31 and decompressed with the decompression valve 33. Therefore, high pressures are not applied to the pressure sensor 52 and so the pressure sensor 52 need not be one that has a sealing property against a high pressure gas and is accordingly expensive. Moreover, it is possible to make the structure of the gas piping 32a around the pressure sensor 52 simpler. The relationship between pressures in the primary chamber 33a and the secondary chamber 33b in the decompression valve 33 is monotonical as shown in FIG. 4: when the pressure in the primary chamber 33a increases, the pressure in the secondary chamber 33b also increases; and when the pressure in the primary chamber 33a decreases, the pressure in the secondary chamber 33b also decreases.

Therefore, the pressure in the primary chamber 33a corresponding to the pressure in the secondary chamber 33b of the decompression valve 33 has only one value, and so it is easy to determine the pressure on the primary chamber 33a side from the pressure on the secondary chamber 33b side measured with the pressure sensor 52. The pressures in the primary chamber 33a and in the secondary chamber 33b of the decompression valve 33 vary also according to the hydrogen gas flow rate supplied from the hydrogen tank 31 to the fuel cell 25. However, the remaining gas amount calculating device A according to a preferred embodiment is arranged to calculate the hydrogen gas flow rate from the generated electric current detected with the current sensor 58, and to determine the pressure and the amount of hydrogen gas remaining in the hydrogen tank 31 additionally using the hydrogen gas flow rate. Thus, it is possible to calculate with better accuracy the pressure and the amount of hydrogen gas remaining in the hydrogen tank 31.

The remaining gas amount calculating device A is not limited to the preferred embodiments described above but may be appropriately modified. For example, while the opening/closing valve 31*a* is used as the opening/closing portion for opening/closing the hydrogen tank 31, and the regulating valve 31*b* is used as the pressure regulating valve for regulating the hydrogen gas flow rate passing through the gas piping 32 in the above preferred embodiments, it may be alternatively arranged that the opening/closing valve 41*a* is omitted, and the regulating valve 31*b* is used as both a pressure regulating valve and an opening/closing valve for opening/closing the flow passage of the gas pipe 32*a*.

Further, while the remaining gas amount calculating device A is mounted on the motorcycle 10 in the above preferred embodiments, the apparatus having the remaining gas amount calculating device A mounted thereon is not limited to the two-wheeled motorcycle 10 but may be three-wheeled motorcycle or four-wheeled automobile or any apparatus other than a vehicle. Further, it is possible to replace hydrogen gas with another gas and the gas container with any gas container other than the hydrogen gas tank. In other words, the preferred embodiments of the present invention may be utilized in any apparatus as long as it derives gas gradually from a gas container. Also, the portions defining the remaining gas amount calculating device A of the preferred embodiments of the present invention may be modified within the technical scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A remaining gas amount calculating device comprising:
a gas container holding a specified gas;
a decompression device arranged to depressurize the gas delivered from the gas container, the decompression device including a decompression device body having an inlet side and an outlet side;
a gas pressure measuring device arranged to measure a pressure of the depressurized gas depressurized by the decompression device; and
a remaining gas amount calculating device arranged to determine an amount of gas remaining in the gas container by calculating a pressure of the gas in the gas container based on the pressure measured with the gas pressure measuring device; wherein
the decompression device is arranged such that the relationship between the pressure at the inlet side of the decompression device body through which the gas is provided and the pressure at the outlet side of the decompression device body through which the depressurized gas is delivered is a monotonical relationship so that when the inlet side pressure increases the outlet side pressure also increases and when the inlet side pressure decreases the outlet side pressure also decreases.

2. The remaining gas amount calculating device of claim 1, further comprising:

a throttling surface having a diameter increasing from the inlet side toward the outlet side provided in a boundary portion between the inlet side and the outlet side on an inside surface of the decompression device body; and
a piston having a diameter increasing from the inlet side toward the outlet side and arranged to close communication between the inlet side and the outlet side as it contacts the throttling surface, and to define a gas passage, between the piston and the throttling surface as it retracts from the throttling surface, to provide communication between the inlet side and the outlet side.

3. The remaining gas amount calculating device of claim 2, further comprising a spring arranged to force the piston to retract from the throttling surface.

4. The remaining gas amount calculating device of claim 1, wherein the gas is hydrogen gas, the gas container is a hydrogen tank, and the hydrogen gas delivered from the hydrogen tank is sent to a fuel cell arranged to generate electric power by causing a reaction between the hydrogen gas and oxygen gas.

5. The remaining gas amount calculating device of claim 4, further comprising a generated electric current detector arranged to detect an electric current generated by the fuel cell, wherein the remaining gas amount calculating device calculates a hydrogen gas flow rate supplied from the hydrogen tank to the fuel cell according to the generated electric current detected by the generated current detector, and determines the remaining gas amount in the hydrogen tank based on the hydrogen gas flow rate.

6. A remaining gas amount calculating device comprising:
a gas container holding a specified gas;
a decompression device arranged to depressurize the gas delivered from the gas container;
a gas pressure measuring device arranged to measure a pressure of the depressurized gas depressurized by the decompression device; and
a remaining gas amount calculating device arranged to determine an amount of gas remaining in the gas container by calculating a pressure of the gas in the gas container based on the pressure measured with the gas pressure measuring device; wherein the decompression device includes:
an inlet side arranged to provide the gas;
an outlet side arranged to deliver the depressurized gas;
a throttling surface arranged between the inlet side and the outlet side and having a diameter increasing toward the outlet side; and
a piston arranged to close communication between the inlet side and the outlet side by contacting the throttling surface, and to define a gas passage between the inlet side and the outlet side by retracting from the throttling surface.

7. The remaining gas amount calculating device of claim 6, further comprising a spring arranged to force the piston to retract from the throttling surface.

8. The remaining gas amount calculating device of claim 6, wherein the gas is hydrogen gas, the gas container is a hydrogen tank, and the hydrogen gas delivered from the hydrogen tank is sent to a fuel cell arranged to generate electric power by causing a reaction between the hydrogen gas and oxygen gas.

9. The remaining gas amount calculating device of claim 8, further comprising a generated electric current detector arranged to detect an electric current generated by the fuel cell, wherein the remaining gas amount calculating device calculates a hydrogen gas flow rate supplied from the hydrogen tank to the fuel cell according to the generated electric current detected by the generated current detector, and determines the remaining gas amount in the hydrogen tank based on the hydrogen gas flow rate.

10. A decompression device arranged to depressurize a gas delivered from a gas container holding a specified gas, the decompression device including:

an inlet side arranged to provide the gas;

an outlet side arranged to deliver the depressurized gas;

a throttling surface arranged between the inlet side and the outlet side and including a straight, inclined surface flaring outward from the inlet side toward the outlet side; and a piston arranged to close communication between the inlet side and the outlet side by contacting the throttling surface, and to define a gas passage between the inlet side and the outlet side by retracting from the throttling surface.

11. The decompression device of claim 10, wherein the piston is arranged to contact the throttling surface when the piston moves in a direction from the outlet side toward the inlet side.

12. The decompression device of claim 10, wherein a portion of the piston is arranged to contact the straight, inclined surface of the throttling surface.

13. The decompression device of claim 10, wherein a shape of the throttling surface corresponds to a shape of a portion of the piston arranged to contact the throttling surface.

* * * * *